United States Patent
He et al.

(10) Patent No.: US 12,367,155 B2
(45) Date of Patent: Jul. 22, 2025

(54) METHOD AND APPARATUS FOR RESTORING RUNNING STATUS OF APPLICATION, AND STORAGE MEDIUM

(71) Applicant: HUAWEI TECHNOLOGIES CO., LTD., Guangdong (CN)

(72) Inventors: Jingxian He, Hangzhou (CN); Jianhai Luan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 18/146,614

(22) Filed: Dec. 27, 2022

(65) Prior Publication Data

US 2023/0136649 A1   May 4, 2023

Related U.S. Application Data

(63) Continuation of application No. PCT/CN2021/095783, filed on May 25, 2021.

(30) Foreign Application Priority Data

Jun. 28, 2020   (CN) .................. 202010598055.2

(51) Int. Cl.
G06F 12/1009   (2016.01)
G06F 12/0882   (2016.01)
(Continued)

(52) U.S. Cl.
CPC ...... *G06F 12/1009* (2013.01); *G06F 12/0882* (2013.01)

(58) Field of Classification Search
CPC .................. G06F 12/1009; G06F 12/0882
(Continued)

(56) References Cited

U.S. PATENT DOCUMENTS 7,676,554 B1    3/2010  Malmskog et al.
2011/0289287 A1*  11/2011  Yamamoto ............ G06F 3/0605
                                                    711/E12.001
(Continued)

FOREIGN PATENT DOCUMENTS

CN    102662799 A    9/2012
CN    103744795 A    4/2014
(Continued)

OTHER PUBLICATIONS

Sanidhya Kashyap:"Instant OS Updates via Userspace Checkpoint-and-Restart".Jun. 22-24, 2016, Denver, CO, USA, total 16 pages.

*Primary Examiner* — Arpan P. Savla
*Assistant Examiner* — Sidney Li
(74) *Attorney, Agent, or Firm* — WOMBLE BOND DICKINSON (US) LLP (57) ABSTRACT

Embodiments of this application disclose a method and an apparatus for restoring a running status of an application, and a storage medium, and relate to the field of software technologies. In embodiments of this application, in a running process of an application, management information of a first virtual memory area corresponding to a first physical memory area is stored. When the application exits abnormally, a physical page of the first physical memory area is maintained, to store the physical page and prevent the physical page from being reclaimed. When the application is restored and started, a mapping relationship between the first virtual memory area and the first physical memory area can be re-established based on the management information of the first virtual memory area.

18 Claims, 2 Drawing Sheets

Store management information of a first virtual memory area corresponding to a first physical memory area in a proper running process of an application, where the first physical memory area stores critical data in a running process of the application — 201

When it is detected that the application exits abnormally, maintain a physical page of the first physical memory area — 202

Remap the physical page corresponding to the first physical memory area to the first virtual memory area based on the management information of the first virtual memory area when it is detected that the application is started, to restore a running status of the application — 203

(51) Int. Cl.
*G06F 11/07* (2006.01)
*G06F 11/14* (2006.01)

(58) Field of Classification Search
USPC .......................................................... 711/206
See application file for complete search history.

(56) References Cited

U.S. PATENT DOCUMENTS

2015/0074367 A1* 3/2015 Cher ..................... G06F 11/008
  711/165
2020/0409759 A1* 12/2020 Tsirkin .................. G06F 9/5022
2022/0075696 A1* 3/2022 Zhang ................. G06F 11/0751

FOREIGN PATENT DOCUMENTS

CN 107315598 A 11/2017
CN 111274503 A 6/2020

* cited by examiner

METHOD AND APPARATUS FOR
RESTORING RUNNING STATUS OF
APPLICATION, AND STORAGE MEDIUM

CROSS-REFERENCE TO RELATED APPLICATIONS

This application is a continuation of International Application No. PCT/CN2021/095783, filed on May 25, 2021, which claims priority to Chinese Patent Application No. 202010598055.2, filed on Jun. 28, 2020. The disclosures of the aforementioned applications are hereby incorporated by reference in their entireties.

TECHNICAL FIELD

This application relates to the field of software technologies, and in particular, to a method and an apparatus for restoring a running status of an application, and a storage medium.

BACKGROUND

An application is run on an operating system of a terminal, and is prone to abnormally exit due to various factors. After the application exits abnormally, the operating system of the terminal reclaims and reuses a physical memory that stores critical data of the application. As a result, the critical data is lost, and it is difficult to subsequently restore, based on the critical data, the application to a state in which running of the application is terminated.

Currently, in a proper running process of the application, the critical data in the physical memory is written into a disk file every certain period of time for backup, to avoid loss of the critical data of the application stored in the physical memory. When the application is restarted after the application exits abnormally, the critical data that is backed up is read from the disk file to restore a running status of the application.

However, because the application backs up application data to the disk file periodically instead of in real time, data integrity cannot be ensured. In addition, when a large quantity of data is backed up to the disk file, it takes a long time to read the data when the application is restarted.

SUMMARY

Embodiments of this application provide a method and an apparatus for restoring a running status of an application, and a storage medium, so that after an application exits abnormally, running of the application can be quickly restored without depending on a disk file. The technical solutions are as follows.

According to a first aspect, a method for restoring a running status of an application is provided, where the method includes: storing management information of a first virtual memory area corresponding to a first physical memory area in a proper running process of an application, where the first physical memory area stores critical data in a running process of the application; maintaining a physical page of the first physical memory area when it is detected that the application exits abnormally; and remapping the physical page of the first physical memory area to the first virtual memory area based on the management information of the first virtual memory area when it is detected that the application is started, to restore a running status of the application.

In the running process of the application, the management information of the first virtual memory area corresponding to the first physical memory area is already stored, and when the application exits abnormally, a physical page of the first physical memory area is maintained, to store the physical page and prevent the physical page from being reclaimed. Therefore, when the application is restored and started, a mapping relationship between the first virtual memory area and the first physical memory area can be re-established based on the management information of the first virtual memory area. In this way, the application can read the critical data stored in the first physical memory to restore running of the application. In comparison with a method of backing up data to a disk file, in this embodiment of this application, data does not need to be backed up, and when the application is restored and started, reading data from a physical memory is faster than reading data from the disk file. Therefore, restoring running of the application is accelerated.

In an embodiment, the management information of the first virtual memory area includes area information of the first virtual memory area and an application identifier of the application, and an implementation process of storing the management information of the first virtual memory area corresponding to the first physical memory area is: correspondingly storing the area information of the first virtual memory area and the application identifier of the application in a first mapping relationship, where the first mapping relationship includes a plurality of pieces of area information and an application identifier of an application corresponding to each piece of area information.

The first mapping relationship is used to manage information about a virtual memory area that stores the critical data of the application. In some possible cases, the first mapping relationship further includes a process identifier of an application corresponding to area information of each virtual area.

In an embodiment, there are a plurality of first virtual memory areas, and when it is detected that the application exits abnormally, the method further includes: performing page alignment processing on the plurality of first virtual memory areas based on area information of the plurality of first virtual memory areas; performing combination processing on the plurality of first virtual memory areas on which page alignment processing is performed, to obtain a first critical area; and storing area information of the first critical area in a second mapping relationship, where the second mapping relationship includes a plurality of mapping entries, and each mapping entry stores area information of one critical area and a physical page corresponding to the corresponding critical area.

When it is detected that the application exits abnormally, an operating system performs page alignment processing on the plurality of first virtual memory areas. Because virtual memory areas on which page alignment processing is performed may overlap, combination processing is performed on a plurality of virtual memory areas on which page alignment processing is performed. In this way, costs of subsequently managing physical pages corresponding to the virtual memory areas can be reduced.

In addition, area information of a combined virtual memory area is stored in the second mapping relationship, to facilitate subsequent collection of a physical page.

In an embodiment, an implementation process of maintaining the physical page corresponding to the first physical memory area is: obtaining area information of a second virtual memory area, where the second virtual memory area refers to a virtual memory area that is currently being demapped and that corresponds to the application; searching the stored second mapping relationship for a target mapping entry that matches the area information of the second virtual memory area, where the second mapping relationship includes a plurality of mapping entries, and each mapping entry stores area information of one critical area and a physical page corresponding to the corresponding critical area; if the target mapping entry that matches the area information of the second virtual memory area exists in the second mapping relationship, obtaining a physical page corresponding to the second virtual memory area, and using the physical page corresponding to the second virtual memory area as the physical page of the first physical memory area; adding a reference count of the physical page of the first physical memory area; and adding the physical page of the first physical memory area to the target mapping entry.

In a process in which the application frequently changes a memory area for storing the critical data, it is not advisable to refresh a physical page. Therefore, in embodiments of this application, when the application exits abnormally, a physical page is collected in a process in which area information of a virtual memory area in the process page table of the application and the physical page are demapped. The physical page that is currently being demapped is used to match the area information of the virtual memory area that stores the critical data and that is stored in the second mapping relationship, so that whether the virtual memory area that is currently being demapped is the memory area that stores the critical data can be determined. If the virtual memory area that is currently being demapped is the memory area that stores the critical data, the reference count of the physical page corresponding to the virtual memory area that is currently being demapped is added by 1, to prevent the physical page from being released. In addition, the physical page is added to a matched mapping entry in the second mapping relationship, to collect the physical page. In this way, the reference count of the physical page of the physical memory area storing the critical data is added, to prevent the physical page from being released, and prevent the corresponding physical memory area from being reclaimed. This avoids a loss of the critical data. In addition, the physical page is stored in the second mapping relationship, which provides a condition for subsequent remapping. In this way, subsequent remapping of the physical page can be performed, so that the application can re-read the critical data, to restore to the running status of the application before the application exits abnormally.

In an embodiment, after the physical page of the first physical memory area is added to the target mapping entry, a status identifier corresponding to the target mapping entry is set to a first identifier, where the first identifier indicates to forbid remapping of a physical page in a corresponding mapping entry.

The status identifier of the target mapping entry is set to the first identifier, so that another application can be prevented from misusing a physical page in the target mapping entry after the application exits abnormally and before the application is started again.

In an embodiment, an implementation process of remapping the physical page of the first physical memory area to the first virtual memory area based on the management information of the first virtual memory area, to restore the running status of the application is: obtaining the area information of the first virtual memory area from the first mapping relationship based on the application identifier of the application; when performing data access based on the area information of the first virtual memory area to trigger a page fault processing procedure, obtaining a stored physical page of the first physical memory area based on the area information of the first virtual memory area; and remapping the physical page of the first physical memory area to the first virtual memory area, to restore the running status of the application based on the critical data stored in the first physical memory area.

In a previous proper running process of the application, the application identifier of the application and the area information of the first virtual memory area are stored in the first mapping relationship. Therefore, when the application is started again, the area information of the first virtual memory area can be obtained from the first mapping relationship based on the application identifier of the application. The first virtual memory area is used as a virtual memory area that is allocated by an operating system and that stores the critical data during this startup of the application. However, the operating system does not allocate a corresponding physical memory area to the application. In this case, when the application accesses the first virtual memory area, a page fault processing procedure is triggered. When the operating system detects that the page fault processing procedure is triggered, the operating system obtains, based on the area information of the first virtual memory area, a physical page corresponding to the first virtual memory area from a previously maintained physical page, where the physical page is the physical page of the first physical memory area, and the physical page is remapped to the first virtual memory area. In this way, when the application accesses the first virtual memory area again, the application can read the stored critical data from the first physical memory area, to restore the running status of the application.

In an embodiment, the first mapping relationship further includes a process identifier of an application corresponding to each piece of area information, and the second mapping relationship further includes a process identifier corresponding to each critical area. On this basis, the method further includes: determining, from the second mapping relationship based on a process identifier included in a first mapping entry in which the application identifier of the application is located, a second mapping entry that includes a same process identifier as the process identifier included in the first mapping entry; updating both of the process identifier included in the first mapping entry and the process identifier included in the second mapping entry to a target process identifier, where the target process identifier refers to a process identifier obtained after the application is restored and started. Correspondingly, an implementation process of obtaining the stored physical page of the first physical memory area based on the area information of the first virtual memory area is: obtaining the physical page of the first physical memory area from the second mapping relationship based on the area information of the first virtual memory area and the target process identifier.

After the application exits abnormally, the process identifier of the application is reclaimed and reused. When the application is started again, the operating system allocates a new process identifier, that is, the target process identifier, to the application. Based on this, process identifiers that are of the application and that are stored in the first mapping relationship and the second mapping relationship may be synchronously updated, to prevent another application that reuses a previous process identifier of the application from misusing information about a memory area in which the critical data of the application is stored.

In an embodiment, after the process identifier in the second mapping entry is updated to the target process identifier, a status identifier in the second mapping entry is modified to a second identifier, where the second identifier indicates that remapping is allowed for a physical page in a corresponding mapping entry.

In an embodiment, an implementation process of remapping the physical page of the first physical memory area to the first virtual memory area is: correcting the reference count, reverse mapping information, status information, global statistics information, and a control structure association relationship that are of the physical page of the first physical memory area; and adding the physical page of the first physical memory area to a target process page table, where the target process page table refers to a process page table corresponding to a process of the application.

The reference count, the reverse mapping information, the status information, the global statistics information, and the control structure association relationship that are of the physical page of the first physical memory area are corrected, so that a status of the physical page is the same as a status of a newly allocated blank physical page to be mapped. In other words, the physical page is in a mapping ready state, to facilitate remapping of the physical page to the first virtual memory area by the operating system.

According to a second aspect, an apparatus for restoring a running status of an application is provided, where the apparatus for restoring the running status of the application has a function of implementing behavior in the method for restoring a running status of an application in the first aspect. The apparatus for restoring the running status of the application includes at least one module, and the at least one module is configured to implement the method for restoring a running status of an application provided in the first aspect.

According to a third aspect, an apparatus for restoring a running status of an application is provided, where a structure of the apparatus for restoring the running status of the application includes a processor and a memory, and the memory is configured to: store a program that supports the apparatus for restoring the running status of the application in executing the method for restoring a running status of an application provided in the first aspect; and store data used to implement the method for restoring a running status of an application provided in the first aspect. The processor is configured to execute the program stored in the memory. An operation apparatus of the storage device may further include a communication bus, and the communication bus is configured to establish a connection between the processor and the memory.

According to a fourth aspect, a computer-readable storage medium is provided, where the computer-readable storage medium stores instructions, and when the instructions are run on a computer, the computer is enabled to perform the method for restoring a running status of an application according to the first aspect.

According to a fifth aspect, a computer program product including instructions is provided. When the computer program product is run on a computer, the computer is enabled to perform the method for restoring a running status of an application according to the first aspect.

Technical effects achieved in the second aspect, the third aspect, the fourth aspect, and the fifth aspect are similar to those achieved by corresponding technical means in the first aspect. Details are not described again herein.

The technical solutions provided in embodiments of this application bring the following beneficial effects.

In embodiments of this application, in a running process of the application, the management information of the first virtual memory area corresponding to the first physical memory area is already stored, and when the application exits abnormally, the physical page corresponding to the first physical memory area is stored, to prevent the physical page corresponding to the first physical memory area from being reclaimed. Therefore, when the application is restored and started, a mapping relationship between the first virtual memory area and the first physical memory area can be re-established based on the management information of the first virtual memory area. In this way, the application can read the critical data stored in the first physical memory to restore the running status of the application. In comparison with a method of backing up data to a disk file, in embodiments of this application, data does not need to be backed up, and when the application is restored and started, reading data from a physical memory is faster than reading data from the disk file. Therefore, restoring running of the application is accelerated.

DESCRIPTION OF EMBODIMENTS

To make the objectives, technical solutions, and advantages of this application clearer, the following further describes the implementations of this application in detail with reference to the accompanying drawings.

Before the method for restoring a running status of an application provided in embodiments of this application is explained in detail, an application scenario in embodiments of this application is first described.

An application is run on an operating system of a terminal, and is prone to abnormally exit due to various factors. For example, an application may exit abnormally due to a fault of the application, or a running application may exit abnormally when an operating system upgrades from an old version to a new version. In a proper running process of the application, a portion of critical data associated with a current running status of the application may be generated. For example, a portion of data required in a running process of the application may be downloaded, or the application obtains some processing results by processing user data. After the application exits abnormally, when the application is started again, the application can restore, by re-reading the critical data, to a state in which the application runs properly before the abnormal exit. The method for restoring a running status of an application provided in embodiments of this application is applied to the foregoing scenario, so that when the application is restarted after the abnormal exit, the application can restore, by reading previously stored critical data, to a running status before the abnormal exit.

Figure 1:
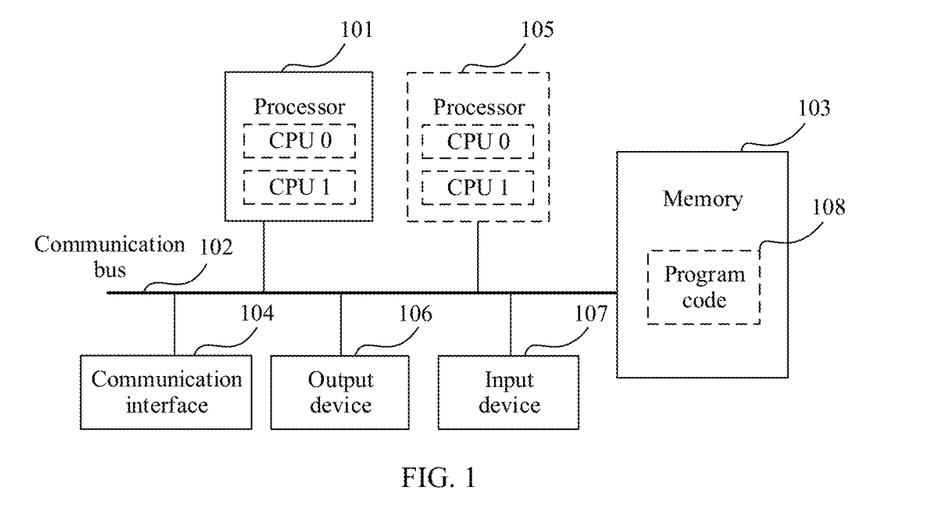
FIG. 1 is a diagram of a system architecture of a terminal according to an embodiment of this application.

FIG. 1 is a schematic diagram of a structure of a terminal 100 according to an embodiment of this application. All functions of the terminal in embodiments of this application can be implemented by using the terminal 100. The terminal 100 may be a smartphone, a tablet computer, a desktop computer, or the like. This is not limited in embodiments of this application. For example, the terminal 100 may include one or more processors 101, a communication bus 102, a memory 103, and one or more communication interfaces 104.

The processor 101 may be a general-purpose central processing unit (CPU), a network processor (NP), a microprocessor, or one or more integrated circuits configured to implement the solutions of this application, for example, an application-specific integrated circuit (ASIC), a programmable logic device (PLD) or a combination thereof. The PLD may be a complex programmable logic device (CPLD), a field programmable gate array (FPGA), generic array logic (GAL), or any combination thereof.

The communication bus 102 is configured to transmit information between the foregoing components. The communication bus 102 may be classified as an address bus, a data bus, a control bus, or the like. For ease of representation, only one thick line is used to represent the bus in the figure, but this does not mean that there is only one bus or only one type of bus.

The memory 103 may be a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be used to carry or store expected program code in a form of instructions or a data structure and that is accessible to a computer. However, this is not limited hereto. The memory 103 may exist independently, and is connected to the processor 101 through the communication bus 102. The memory 103 may alternatively be integrated with the processor 101.

The communication interface 104 is configured to communicate with another device or a communication network by using any apparatus such as a transceiver. The communication interface 104 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

Figure 2:
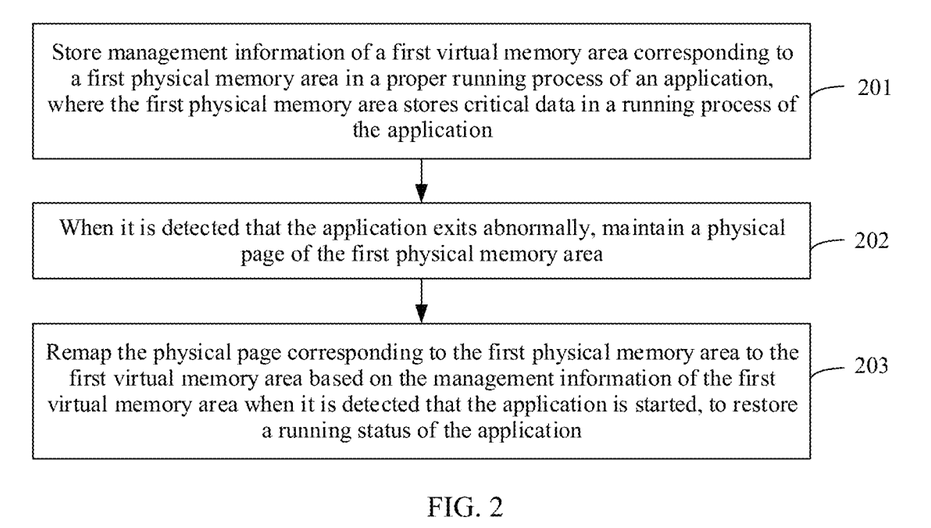
FIG. 2 is a flowchart of a method for restoring a running status of an application according to an embodiment of this application.

In some embodiments, the terminal may include a plurality of processors, for example, a processor 101 and a processor 105 shown in FIG. 2. Each of the processors may be a single-core processor, or may be a multi-core processor. The processor herein may refer to one or more devices, circuits, and/or processing cores configured to process data (for example, computer program instructions).

In a specific implementation, in an embodiment, the terminal may further include an output device 106 and an input device 107. The output device 106 communicates with the processor 101, and may display information in a plurality of manners. For example, the output device 106 may be a liquid crystal display (LCD), a light emitting diode (LED) display device, a cathode ray tube (CRT) display device, a projector, or the like. The input device 107 communicates with the processor 101, and may receive user input in a plurality of manners. For example, the input device 107 may be a mouse, a keyboard, a touch panel device, or a sensing device.

In some embodiments, the memory 103 is configured to store program code 108 for executing the solutions of this application, and the processor 101 may execute the program code 108 stored in the memory 103. The program code may include one or more software modules. The terminal may implement, by using the processor 101 and the program code 108 in the memory 103, the method for restoring a running status of an application provided in the following embodiment in FIG. 2.

The following describes a method for restoring a running status of an application provided in an embodiment of this application.

FIG. 2 is a flowchart of a method for restoring a running status of an application according to an embodiment of this application. The method may be applied to the terminal shown in FIG. 1. Refer to FIG. 2. The method includes the following operations.

Operation 201: Store management information of a first virtual memory area corresponding to a first physical memory area in a proper running process of an application, where the first physical memory area stores critical data in a running process of the application.

When the application is started properly, an operating system of a terminal may allocate, to a process of the application, the first virtual memory area for storing the critical data in the running process of the application and the first physical memory area corresponding to the first virtual memory area, and establish a mapping relationship between the area information of the first virtual memory area and a physical page corresponding to the first physical memory area. In this way, in the proper running process of the application, a physical page of the first physical memory area can be obtained from the mapping relationship based on area information of the first virtual memory area, and then the critical data is stored in the physical page of the first physical memory area.

The critical data of the application refers to some critical status data generated in the running process of the application, for example, a portion of data that is related to a running status and that is downloaded in the running process of the application, or in a running process, result data that is obtained after the application processes a portion of data and that can enable the application to maintain a certain state. The application reads the critical data to present a running status corresponding to the critical data. In addition, a physical page is a basic unit used by an operating system to manage physical memory space.

In this embodiment of this application, a shared memory in the terminal may be specified to manage information about a virtual memory area that stores the critical data and that is corresponding to each application. Based on this, in the proper running process of the application, the operating system generates the management information of the first virtual memory area, and stores the management information into the specified shared memory. The management information of the first virtual memory area includes area information of the first virtual memory area and an application identifier of the application. In addition, the management information further includes a process identifier of the application. The area information of the first virtual memory area includes a start address and a size of the first virtual memory area. The application identifier of the application uniquely identifies the application.

When the operating system stores the management information of the first virtual memory area, the operating system may correspondingly store the application identifier, the process identifier, and the area information of the first virtual memory area of the application into a first mapping relationship in the specified shared memory in a form of a mapping entry. The first mapping relationship includes a plurality of pieces of area information, and an application identifier and a process identifier that are of an application and that are corresponding to each piece of area information.

In an embodiment, when the operating system stores the management information of the first virtual memory area in the first mapping relationship table, the operating system inserts, based on a start address of the first virtual memory area and a page quantity of a page table corresponding to the first virtual memory area, in ascending order of start addresses and in descending order of page quantities, the management information of the first virtual memory area in the first mapping relationship.

In an embodiment, each mapping entry in the first mapping relationship corresponds to a status flag, and the status flag indicates whether a corresponding mapping entry is empty. Based on this, after the management information of the first virtual memory area is inserted into the first mapping relationship, the status flag of the mapping entry may be set to a used state. Subsequently, if the management information of the first virtual memory area in the mapping entry is deleted, the status flag is set to an idle state, so that management information of other virtual memory areas can subsequently reuse the mapping entry.

Operation 202: When it is detected that the application exits abnormally, obtain and store a physical page corresponding to the first physical memory area.

When the operating system detects that the application exits abnormally, the operating system releases a process page table of the application. The process page table of the application includes a mapping relationship between area information of a virtual memory area allocated to a process of the application and a physical page. Before the operating system releases the process page table of the application, the operating system needs to demap the mapping relationship that is between the area information of the virtual memory area and the physical page and that is included in the process page table of the application. Based on this, in a demapping process, the operating system collects a physical page corresponding to the first virtual memory area, that is, the physical page of the first physical memory area, and prevents the physical page from being released after the application exits by maintaining the physical page of the first physical memory area, to facilitate subsequent remapping of the physical page.

It should be noted that, in this embodiment of this application, there may be a plurality of first virtual memory areas allocated by the operating system to the application. In this case, to reduce physical page management costs, before it is detected that the application enters an abnormal exit procedure but does not start demapping, the operating system determines, based on area information of the plurality of first virtual memory areas, to perform page alignment processing on the plurality of first virtual memory areas; the operating system performs combination processing on the plurality of first virtual memory areas on which page alignment processing is performed, to obtain a first critical area; and the operating system stores area information of the first critical area as a mapping entry into a second mapping relationship, where the second mapping relationship includes a plurality of mapping entries, and each mapping entry stores area information of one critical area and a physical page corresponding to the corresponding critical area.

For an implementation method in which the operating system performs page alignment processing on a virtual memory area, refer to a related technology. Details are not described again in embodiments of this application. After page alignment processing is performed on the plurality of first virtual memory areas, the virtual memory areas on which page alignment is performed may overlap. Based on this, the operating system performs combination processing on the virtual memory areas on which page alignment processing is performed, to reduce subsequent physical page management costs.

For example, the operating system combines, into one virtual memory area, virtual memory areas with a same start address in the plurality of virtual memory areas on which page alignment processing is performed, and a page quantity of a combined virtual memory area is a page quantity of a largest virtual memory area in the plurality of virtual memory areas with the same start address. Adjacent virtual memory areas are combined, and a page quantity of a combined virtual memory area is a sum of page quantities of the adjacent virtual memory areas. In addition, to facilitate subsequent access to the critical data, after combining the virtual memory areas, the operating system synchronously updates a recorded initial address offset value of a critical data variable in the virtual memory area.

Figure 3:
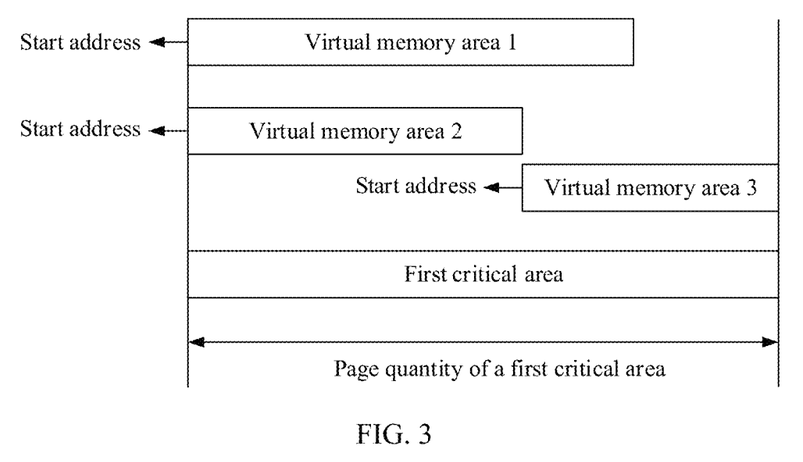
FIG. 3 is a schematic diagram of combining virtual memory areas according to an embodiment of this application.

FIG. 3 is a schematic diagram of combining virtual memory areas according to an embodiment of this application. As shown in FIG. 3, the virtual memory areas on which page alignment processing is performed are respectively a virtual memory area 1, a virtual memory area 2, and a virtual memory area 3. Start addresses of the virtual memory area 1 and the virtual memory area 2 are the same, and the virtual memory area 3 is adjacent to the virtual memory area 2. An operating system first combines the virtual memory area 2 and the virtual memory area 3 to obtain a virtual memory area on which first combination is performed, where a page quantity of a combined virtual memory area is a sum of a page quantity of the virtual memory area 2 and a page quantity of the virtual memory area 3. Then, the virtual memory area on which the first combination is performed is combined with the virtual memory area 1. Because a size of the virtual memory area on which the first combination is performed is greater than a size of the virtual memory area 1, a page quantity of a combined virtual memory area obtained by combining the virtual memory area on which the first combination is performed and the virtual memory area 1 is a page quantity of the virtual memory area on which the first combination is performed. Finally, FIG. 3 shows a combined virtual memory area obtained by combining the virtual memory areas 1 to 3. In this embodiment of this application, the combined virtual memory area is referred to as a first critical area.

In an embodiment, in some possible cases, there may be only one first virtual memory area allocated to the application. In this case, the operating system performs page alignment processing on the first virtual memory area, and then directly uses a virtual memory area on which page alignment processing is performed as the first critical area without subsequent combination.

After the operating system obtains the first critical area, the operating system stores, in a kernel mode, area information of the first critical area in a mapping entry in the second mapping relationship. The second mapping relationship is an information body that is created by the operating system in the kernel mode and that is used to manage a physical page corresponding to the critical area, that is, an information body that is used to manage a physical page of a physical memory area storing the critical data. The second mapping relationship includes a plurality of mapping entries, and each mapping entry stores area information of one critical area and a physical page corresponding to the critical area. In addition, because the operating system searches, in the kernel mode, for area information of a virtual memory area and a corresponding physical page based on a process identifier, each mapping entry in the second mapping relationship further includes a process identifier corresponding to the area information of the critical area. It should be noted that, for a critical area whose corresponding physical page is not collected, a location that stores a physical page corresponding to the critical area and that is in the mapping entry in which the area information of the critical area is located is temporarily empty. In conclusion, when the operating system stores area information of the first critical area in the mapping entry in the second mapping relationship, the operating system also stores a process identifier of an application corresponding to the area information of the first critical area. Because a physical page corresponding to the first critical area is not collected, a location that is in the mapping entry and that stores a physical page corresponding to the first critical area is empty.

After the area information of the first critical area is stored in the second mapping relationship, when the application exits abnormally and starts to perform demapping, the operating system obtains area information of a second virtual memory area, where the second virtual memory area refers to a virtual memory area that is currently being demapped and that corresponds to the application. The operating system searches a stored second mapping relationship for a mapping entry that matches the area information of the second virtual memory area, where the second mapping relationship includes a plurality of mapping entries, and each mapping entry stores area information of one critical area and a physical page corresponding to the corresponding critical area. If a target mapping entry that includes the area information of the second virtual memory area exists in the second mapping relationship, the operating system obtains a physical page corresponding to the second virtual memory area, and uses the physical page corresponding to the second virtual memory area as the physical page of the first physical memory area; adds a reference count of the physical page of the first physical memory area; and adds the physical page of the first physical memory area to the target mapping entry.

The operating system demaps a mapping relationship between area information of each virtual memory area in the process page table of the application and a corresponding physical page. For a virtual memory area that is currently being demapped, the operating system matches area information of the virtual memory area with area information of a critical area stored in the second mapping relationship. Because the second mapping relationship stores information about the virtual memory area for storing the critical data and the corresponding physical page, if the area information that matches the area information of the second virtual memory area and that is currently being demapped exists in the second mapping relationship, it indicates that the second virtual memory area is a virtual memory area for storing the critical data. In this case, the operating system obtains a physical page corresponding to the second virtual memory area. After the physical page is obtained, because after the physical page is demapped, the reference count of the physical page is decreased by 1, and when the reference count of the physical page is 0, the physical page is released, the operating system adds the reference count of the physical page by 1, to ensure that the physical page is not released subsequently. Then, the operating system stores, in the target mapping entry in which the matched area information of the critical area is located, the physical page as the physical page of the first physical memory area. This can ensure that after the application exits abnormally, the physical page that is of the first physical memory area and that stores the critical data is not released, and the physical page can be collected for subsequent remapping.

It should be noted that the area information described above includes a start address and a size. Based on this, the area information of the critical area that matches the area information of the second virtual memory area may mean that the area information of the critical area is completely the same as the area information of the second virtual memory area; start addresses of the critical area and the second virtual memory area are the same, but a size of the second virtual memory area is smaller than a size of the critical area; it is determined, based on the start address and the size, that an end address of the critical area is the same as an end address of the second virtual memory area, and a size of the second virtual memory area is smaller than a size of the critical area; or both of a start address and an end address of the second virtual memory area fall within an address range of the critical area.

In addition, in this embodiment of this application, because the critical area in the second mapping entry may be obtained by performing page alignment processing and combination on the virtual memory area storing the critical data, when a demapped virtual memory area is used to match the critical area, a plurality of virtual memory areas may all match the critical area. In this case, one critical area corresponds to a plurality of physical pages, that is, a plurality of physical pages may be added to one mapping entry that includes area information of the critical area.

In addition, in an embodiment, because the operating system manages, in the kernel mode, virtual memory areas in ascending order of start addresses of the virtual memory areas. In other words, in a demapping process, the virtual memory areas in the process page table are sequentially demapped in ascending order of the start addresses of the virtual memory areas. Therefore, in this embodiment of this application, mapping entries in the second mapping relationship are also arranged in ascending order of start addresses of critical areas. In this way, matching can be performed between an address of the demapped virtual memory area and a mapping entry in the second mapping relationship. This reduces complexity of collecting a physical page.

Figure 4:
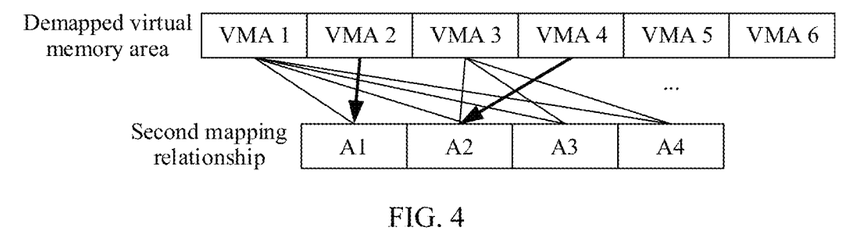
FIG. 4 is a schematic diagram of matching a virtual memory area that is currently demapped with a mapping entry in a second mapping relationship according to an embodiment of this application.

FIG. 4 is a schematic diagram of matching a virtual memory area that is currently demapped with a mapping entry in a second mapping relationship according to an embodiment of this application. As shown in FIG. 4, according to ascending order of start addresses, virtual memory areas that need to be sequentially demapped are a virtual memory area (VMA) 1, VMA 2, VMA 3, VMA 4, VMA 5, and VMA 6. Mapping entries in the second mapping relationship are arranged in ascending order of start addresses of critical areas, that is, A1, A2, A3, and A4. The operating system performs demapping starting from the VMA 1, sequentially matches area information of the VMA 1 with area information in A1 to A4, and if none of the area information in A1 to A4 matches the area information of the VMA 1, the operating system directly performs demapping on the VMA 1. Then, the operating system performs demapping on the VMA 2, and matches, starting from A1, area information of the VMA 2 with the area information in A1 to A4. It is assumed that the area information of the VMA 2 matches area information of A1 during matching, a physical page corresponding to the VM 2 is added to A1, and there is no need to perform matching with subsequent A2 to A4. Then, the operating system performs demapping on the VMA 3. Because the area information of the VMA 2 matches the area information of A1, and a start address of the VMA 3 follows the VMA 2, matching is sequentially performed starting from A2. It is assumed that area information of the VMA 3 does not match any area information in A2 to A4, and the operating system directly performs demapping on the VMA 3. Then, the operating system performs demapping on the VMA 4, and performs matching starting from A2. It is assumed that area information of the VMA 4 matches area information of a critical area in A2, a physical page corresponding to the VMA 4 is added to A2. Subsequently, for the VMA 5, matching is performed starting from A3, and the rest can be deduced by analogy.

In an embodiment, after the operating system adds the physical page corresponding to the demapped virtual memory area to the target mapping entry in a second mapping table, the operating system sets a status identifier corresponding to the target mapping entry to a first identifier, where the first identifier indicates to forbid remapping of the physical page in the target mapping entry. This can prevent another subsequent application that reuses a current process identifier of the application from misusing the physical page in the target mapping entry after the application exits.

After the demapping is completed, collection and storage of the physical page are correspondingly completed. In this case, the operating system releases the process page table of the application, and then the application exits.

Operation 203: Remap the physical page corresponding to the first physical memory area to the first virtual memory area based on the management information of the first virtual memory area when it is detected that the application is started, to restore running of the application.

After the application exits abnormally, when it is detected that the application is started, the operating system obtains the area information of the first virtual memory area from the first mapping relationship based on the application identifier of the application. When performing data access based on the area information of the first virtual memory area to trigger a page fault processing procedure, the operating system obtains a stored physical page of the first physical memory area based on the area information of the first virtual memory area; and remaps the physical page of the first physical memory area to the first virtual memory area, to restore a running status of the application based on the critical data stored in the first physical memory area.

It should be noted that, when it is detected that the application is started, the operating system allocates a new process identifier to a process of the application, but the application identifier of the application remains unchanged. Based on this, the operating system obtains, from the first mapping relationship based on the application identifier of the application, the area information of the first virtual memory area corresponding to the application identifier, and continues to use the first virtual memory area as an area that is allocated to the application and that stores the critical data. However, different from a case when the application is properly running, the operating system does not allocate a corresponding physical memory area to the first virtual memory area.

It can be learned from the foregoing descriptions of operations 201 and 202 that both of the mapping entries in the first mapping relationship and the second mapping relationship include the process identifier. After the application exits abnormally, the process identifier is reclaimed and reused. When the application is started again, the operating system reallocates a new process identifier to the process of the application, that is, the target process identifier. In this case, after the operating system obtains the area information of the first virtual memory area, the operating system may update the process identifiers in the first mapping relationship and the second mapping relationship.

After the operating system finds, in the first mapping relationship, the first mapping entry that includes the application identifier of the application, the operating system determines, from the second mapping relationship based on the process identifier included in the first mapping entry, the second mapping entry that is the same as the process identifier included in the first mapping entry, and updates both of the process identifiers included in the first mapping entry and the second mapping entry to the target process identifier.

In an embodiment, it can be learned from the description in operation 202 that, in a demapping process in which the application exits abnormally, after a collected physical page is added to a corresponding mapping entry, the status identifier of the mapping entry may be set to a first identifier, to forbid remapping of the physical page in the mapping entry. Therefore, it can be learned that the status identifier in the second mapping entry currently is the first identifier. In this case, after the process identifier included in the second mapping entry is synchronously updated to the target process identifier, because a physical page in the second mapping entry needs to be remapped subsequently to restore running of the application, the operating system needs to modify the status identifier of the second mapping entry to a second identifier, where the second identifier indicates that remapping is allowed for a physical page in a corresponding mapping entry.

Because the process identifier in the second mapping relationship is updated before the status identifier in the second mapping entry is modified, after the status identifier is modified and before the physical page is remapped, another application that reuses a process identifier before the application exits abnormally can be prevented from misusing the physical page in the second mapping entry.

When the application is restored and started, the operating system does not allocate a physical memory area corresponding to the first virtual memory area to the application, that is, a mapping relationship between the area information of the first virtual memory area and the corresponding physical memory area is not established. Therefore, when data access is performed by using the area information of the first virtual memory area, a page fault processing procedure is triggered. After the page fault processing procedure is triggered, the operating system obtains a stored physical page corresponding to the first virtual memory area from the second mapping relationship based on the area information of the first virtual memory area.

Because the operating system in the kernel mode usually manages, by using a process identifier, memory area information corresponding to an application, the operating system may match the target process identifier and the area information of the first virtual memory area with each mapping entry including a process identifier and area information that are stored in the second mapping relationship. When the application exits abnormally, in a demapping process, the physical page corresponding to the first virtual memory area is added to a mapping entry that includes the area information of the first virtual memory area and the process identifier and that is in the second mapping relationship, and after the application is restored and started, the process identifier in the mapping entry is also updated to the target process identifier. Therefore, a matched mapping entry can be found in the second mapping relationship by using the area information of the first virtual memory area and the target process identifier, and a physical page in the matched mapping entry can be obtained. The physical page is a physical page corresponding to the first virtual memory area, that is, a physical page of the first physical memory area.

After the operating system obtains the physical page of the first physical memory area, the operating system remaps the physical page to the first virtual memory area. In this way, the application can access the critical data in the first physical memory area by using the first virtual memory area, to restore a running status of the application.

The operating system first corrects the reference count, reverse mapping information, status information, global statistics information, and a control structure association relationship that are of the physical page of the first physical memory area. Then, the physical page of the first physical memory area is added to a target process page table, to complete mapping of the physical page of the first physical memory area to the first virtual memory area. The target process page table refers to a process page table corresponding to a process after this startup of the application.

It should be noted that the reference count of the physical page is used to record a quantity of times that the physical page is used. After the physical page is remapped to the first virtual memory area, the reference count of the physical page is added by 1.

The reverse mapping information includes a reverse mapping count and a reverse mapping relationship. The reverse mapping relationship is a mapping relationship between a physical page and a page table entry of a process that uses the physical page. A process corresponding to a physical page can be reversely found by using the reverse mapping relationship. The reverse mapping count is a count of page table entries mapped to the physical page. Before the operating system remaps the physical page, the operating system may clear a reverse mapping relationship including the physical page, and correct a corresponding reverse mapping count.

The status information of the physical page includes a mappable state, an unmappable state, and the like. Because the physical page needs to be remapped, status information of the physical page needs to be changed to the mappable state.

The global statistics information is statistics information that is about use of all physical pages and that is recorded in a terminal, including a quantity of use times of each physical page, and the like.

The control structure association relationship refers to a relationship between the physical page and a system physical page management linked list. Generally, when a physical page is released, the operating system removes the physical page from each management linked list. In this way, the physical page can be mapped again subsequently. In the foregoing procedure, the physical page of the first physical memory area is not released. Therefore, the physical page is not removed from the management linked list. In this case, to remap the physical page, the physical page needs to be removed from a management linked list in which the physical page is currently located, to correct a control structure association relationship of the physical page.

After the foregoing information is corrected, the physical page is in a mapping ready state. Then, the operating system adds the mapping relationship between the physical page and the area information of the first virtual memory area to the target process page table, to complete remapping of the physical page. In this way, when the application accesses the first virtual memory area, a corresponding physical page is obtained based on the mapping relationship in the target process page table, and critical data on the physical page can be read. In this way, the application is restored to a running status corresponding to the critical data before the abnormal exit.

In an embodiment, in some possible cases, after the application is restored and is running, the operating system deletes the application identifier, the process identifier, and the area information of the virtual memory area that are of the application and that are stored in the first mapping relationship. In other words, in this embodiment of this application, management information corresponding to the application can be dynamically created or deleted in the first mapping relationship.

In this embodiment of this application, in a running process of the application, the management information of the first virtual memory area corresponding to the first physical memory area is already stored, and when the application exits abnormally, a physical page of the first physical memory area is maintained, to store the physical page and prevent the physical page from being reclaimed. Therefore, when the application is restored and started, a mapping relationship between the first virtual memory area and the first physical memory area can be re-established based on the management information of the first virtual memory area. In this way, the application can read the critical data stored in the first physical memory to restore the running status of the application. In comparison with a method of backing up data to a disk file, in embodiments of this application, data does not need to be backed up, and integrity of the critical data can be ensured. In addition, when the application is started, reading data from a physical memory is faster than reading data from the disk file. Therefore, restoring running of the application is accelerated.

The following describes an apparatus for restoring a running status of an application provided in an embodiment of this application.

Figure 5:
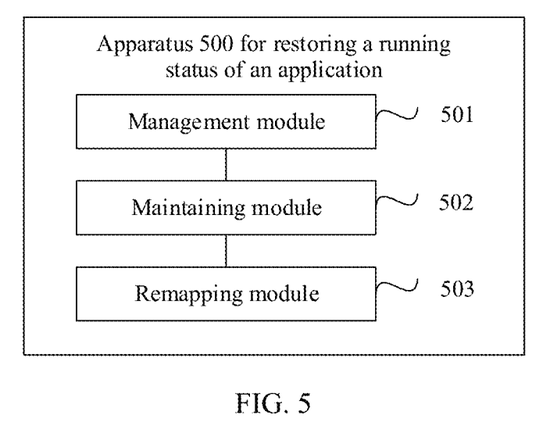
FIG. 5 is a schematic diagram of a structure of an apparatus for restoring a running status of an application according to an embodiment of this application.

Refer to FIG. 5. An embodiment of this application provides an apparatus 500 for restoring a running status of an application. The apparatus 500 includes:
  a management module 501, configured to perform operation 201 in the foregoing embodiments;
  a maintaining module 502, configured to perform operation 202 in the foregoing embodiments; and
  a remapping module 503, configured to perform operation 203 in the foregoing embodiments.

The management module 501 is executed by the processor in the terminal shown in FIG. 1 in a user mode and a kernel mode, and the maintaining module 502 and the remapping module 503 are executed by the processor in the terminal shown in FIG. 1 in a kernel mode.

In an embodiment, the management information of the first virtual memory area includes area information of the first virtual memory area and an application identifier of the application, and the management module 501 is mainly configured to:

correspondingly store the area information of the first virtual memory area and the application identifier of the application in a first mapping relationship, where the first mapping relationship includes a plurality of pieces of area information and an application identifier of an application corresponding to each piece of area information.

In an embodiment, there are a plurality of first virtual memory areas, and when it is detected that the application exits abnormally, the maintaining module 502 is further configured to:

perform page alignment processing on the plurality of first virtual memory areas based on area information of the plurality of first virtual memory areas;

perform combination processing on the plurality of first virtual memory areas on which page alignment processing is performed, to obtain a first critical area; and store area information of the first critical area in a second mapping relationship, where the second mapping relationship includes a plurality of mapping entries, and each mapping entry stores area information of one critical area and a physical page corresponding to the corresponding critical area.

In an embodiment, the maintaining module 502 is mainly configured to:

obtain area information of a second virtual memory area, where the second virtual memory area refers to a virtual memory area that is currently being demapped and that corresponds to the application;

search the stored second mapping relationship for a target mapping entry that matches the area information of the second virtual memory area, where the second mapping relationship includes a plurality of mapping entries, and each mapping entry includes area information of one critical area and a physical page corresponding to the corresponding critical area;

if the target mapping entry that matches the area information of the second virtual memory area exists in the second mapping relationship, obtain a physical page corresponding to the second virtual memory area, and use the physical page corresponding to the second virtual memory area as the physical page of the first physical memory area;

add a reference count of the physical page of the first physical memory area; and add the physical page of the first physical memory area to the target mapping entry.

In an embodiment, the maintaining module 502 is further configured to:

set a status identifier corresponding to the target mapping entry to a first identifier, where the first identifier indicates to forbid remapping of a physical page in a corresponding mapping entry.

In an embodiment, the remapping module 503 is mainly configured to:

obtain the area information of the first virtual memory area from the first mapping relationship based on the application identifier of the application;

when performing data access based on the area information of the first virtual memory area to trigger a page fault processing procedure, obtain a stored physical page of the first physical memory area based on the area information of the first virtual memory area; and remap the physical page of the first physical memory area to the first virtual memory area, to restore the running status of the application based on the critical data stored in the first physical memory area.

In an embodiment, the first mapping relationship further includes a process identifier of an application corresponding to each piece of area information, the second mapping relationship further includes a process identifier corresponding to each critical area, and the apparatus 500 is further configured to:

determine, from the second mapping relationship based on a process identifier included in a first mapping entry in which the application identifier of the application is located, a second mapping entry that includes a same process identifier as the process identifier included in the first mapping entry; and updating both of the process identifier included in the first mapping entry and the process identifier included in the second mapping entry to a target process identifier, where the target process identifier refers to a process identifier obtained after an application is restored and started.

The remapping module 503 is mainly configured to:

obtain the physical page of the first physical memory area from the second mapping relationship based on the area information of the first virtual memory area and the target process identifier.

In an embodiment, the apparatus 500 is further configured to:

modify a status identifier of the second mapping entry into a second identifier, where the second identifier indicates that remapping is allowed for a physical page in a corresponding mapping entry.

In an embodiment, the remapping module 503 is mainly configured to:

correct the reference count, reverse mapping information, status information, global statistics information, and a control structure association relationship that are of the physical page of the first physical memory area; and add the physical page of the first physical memory area to a target process page table, where the target process page table refers to a process page table corresponding to a process of the application.

In conclusion, in embodiments of this application, the management information of the first virtual memory area corresponding to the first physical memory area is already stored in the running process of the application, and when the application exits abnormally, the physical page corresponding to the first physical memory area is maintained to store the physical page and prevent the physical page from being reclaimed. Therefore, when the application is restored and restarted, the mapping relationship between the first virtual memory area and the first physical memory can be re-established based on the management information of the first virtual memory area, and the application can read the critical data stored in the first physical memory to restore the running status of the application. In comparison with a method of backing up data to a disk file, in embodiments of this application, data does not need to be backed up, and integrity of the critical data can be ensured. In addition, when the application is started, reading data from a physical memory is faster than reading data from the disk file. Therefore, restoring running of the application is accelerated.

It should be noted that when the apparatus for restoring a running status of an application provided in the foregoing embodiments restores a running status of an application, division of the foregoing functional modules is merely used as an example for description. In an actual application, the foregoing functions may be allocated to different functional modules for implementation based on requirements. In other words, an inner structure of a device is divided into different functional modules, to complete all or some of the functions described above. In addition, the apparatus for restoring a running status of an application in the foregoing embodiments pertains to a same idea as the embodiment of the method for restoring a running status of an application. For a specific implementation process of the apparatus, refer to the method embodiment. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

It should be understood that "at least one" mentioned in this specification means one or more and "a plurality of" means two or more. In descriptions of this specification, "/" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The foregoing descriptions are embodiments provided in embodiments of this application, but are not intended to limit embodiments of this application. Any modification, equivalent replacement, or improvement made without departing from the spirit and principle of embodiments of this application shall fall within the protection scope of embodiments of this application.

What is claimed is:

1. A method for restoring a running status of an application, comprising:
    storing management information of a first virtual memory area corresponding to a first physical memory area in a proper running process of an application, wherein the first physical memory area stores critical data in a running process of the application;
    maintaining a physical page of the first physical memory area when it is detected that the application exits abnormally, including:
        obtaining area information of a second virtual memory area, wherein the second virtual memory area includes a virtual memory area that is currently being demapped and that corresponds to the application;
        searching stored second mapping relationship for a target mapping entry that matches the area information of the second virtual memory area, wherein the second mapping relationship comprises a plurality of mapping entries, and each mapping entry stores area information of one critical area and a physical page corresponding to the corresponding critical area;
        if the target mapping entry that matches the area information of the second virtual memory area exists in the second mapping relationship, obtaining a physical page corresponding to the second virtual memory area, and using the physical page corresponding to the second virtual memory area as the physical page of the first physical memory area;
        adding a reference count of the physical page of the first physical memory area; and
        adding the physical page of the first physical memory area to the target mapping entry; and
    remapping the physical page of the first physical memory area to the first virtual memory area based on the management information of the first virtual memory area when it is detected that the application is started, to restore a running status of the application.

2. The method according to claim 1, wherein the storing management information of a first virtual memory area corresponding to a first physical memory area comprises:
    correspondingly storing area information of the first virtual memory area and an application identifier of the application in a first mapping relationship, wherein the first mapping relationship comprises a plurality of pieces of area information and an application identifier of an application corresponding to each piece of area information, wherein the management information of the first virtual memory area comprises the area information of the first virtual memory area and the application identifier of the application.

3. The method according to claim 2, further comprising:
    when it is detected that the application exits abnormally, performing page alignment processing on a plurality of first virtual memory areas based on area information of the plurality of first virtual memory areas;

performing combination processing on the plurality of first virtual memory areas on which page alignment processing is performed, to obtain a first critical area; and storing area information of the first critical area in a second mapping relationship, wherein the second mapping relationship comprises a plurality of mapping entries, and each mapping entry stores area information of one critical area and a physical page corresponding to the corresponding critical area.

4. The method according to claim 1, further comprising: after the adding the physical page of the first physical memory area to the target mapping entry, setting a status identifier corresponding to the target mapping entry to a first identifier, wherein the first identifier indicates to forbid remapping of a physical page in a corresponding mapping entry.

5. The method according to claim 2, wherein the remapping the physical page of the first physical memory area to the first virtual memory area based on the management information of the first virtual memory area, to restore a running status of the application comprises:

obtaining the area information of the first virtual memory area from the first mapping relationship based on the application identifier of the application;

when performing data access based on the area information of the first virtual memory area to trigger a page fault processing procedure, obtaining a stored physical page of the first physical memory area based on the area information of the first virtual memory area; and remapping the physical page of the first physical memory area to the first virtual memory area, to restore the running status of the application based on the critical data stored in the first physical memory area.

6. The method according to claim 5, further comprising: determining, from the second mapping relationship based on a process identifier comprised in a first mapping entry in which the application identifier of the application is located, a second mapping entry that comprises a same process identifier as the process identifier comprised in the first mapping entry, wherein the first mapping relationship further comprises a process identifier of an application corresponding to each piece of area information, the second mapping relationship further comprises a process identifier corresponding to each critical area;

updating both of the process identifier comprised in the first mapping entry and the process identifier comprised in the second mapping entry to a target process identifier, wherein the target process identifier includes a process identifier obtained after an application is restored and started; and the obtaining a stored physical page of the first physical memory area based on the area information of the first virtual memory area comprises:

obtaining the physical page of the first physical memory area from the second mapping relationship based on the area information of the first virtual memory area and the target process identifier.

7. The method according to claim 6, further comprising: after the updating both of the process identifier comprised in the first mapping entry and the process identifier comprised in the second mapping entry to a target process identifier, modifying a status identifier of the second mapping entry into a second identifier, wherein the second identifier indicates that remapping is allowed for a physical page in a corresponding mapping entry.

8. The method according to claim 5, wherein the remapping the physical page of the first physical memory area to the first virtual memory area comprises:

correcting the reference count, reverse mapping information, status information, global statistics information, and a control structure association relationship that are of the physical page of the first physical memory area; and adding the physical page of the first physical memory area to a target process page table, wherein the target process page table includes a process page table corresponding to a process of the application.

9. An apparatus for restoring a running status of an application, wherein the apparatus comprises:

at least one processor; and one or more memories coupled to the at least one processor and storing programming instructions for execution by the at least one processor to cause the apparatus to:

store management information of a first virtual memory area corresponding to a first physical memory area in a proper running process of an application, wherein the first physical memory area stores critical data in a running process of the application;

maintain a physical page of the first physical memory area when it is detected that the application exits abnormally; and remap the physical page of the first physical memory area to the first virtual memory area based on the management information of the first virtual memory area when it is detected that the application is started, to restore a running status of the application, wherein the programming instructions, when executed by the at least one processor, cause the apparatus to:

obtain area information of a second virtual memory area, wherein the second virtual memory area includes a virtual memory area that is currently being demapped and that corresponds to the application;

search stored second mapping relationship for a target mapping entry that matches the area information of the second virtual memory area, wherein the second mapping relationship comprises a plurality of mapping entries, and each mapping entry stores area information of one critical area and a physical page corresponding to the corresponding critical area;

if the target mapping entry that matches the area information of the second virtual memory area exists in the second mapping relationship, obtain a physical page corresponding to the second virtual memory area, and use the physical page corresponding to the second virtual memory area as the physical page of the first physical memory area;

add a reference count of the physical page of the first physical memory area; and add the physical page of the first physical memory area to the target mapping entry.

10. The apparatus according to claim 9, wherein the management information of the first virtual memory area comprises area information of the first virtual memory area and an application identifier of the application, and the programming instructions, when executed by the at least one processor, cause the apparatus to:

correspondingly store the area information of the first virtual memory area and the application identifier of the application in a first mapping relationship, wherein the first mapping relationship comprises a plurality of pieces of area information and an application identifier of an application corresponding to each piece of area information.

11. The apparatus according to claim 10, wherein there are a plurality of first virtual memory areas, and when it is detected that the application exits abnormally, the programming instructions, when executed by the at least one processor, cause the apparatus to:
perform page alignment processing on the plurality of first virtual memory areas based on area information of the plurality of first virtual memory areas;
perform combination processing on the plurality of first virtual memory areas on which page alignment processing is performed, to obtain a first critical area; and
store area information of the first critical area in a second mapping relationship, wherein the second mapping relationship comprises a plurality of mapping entries, and each mapping entry stores area information of one critical area and a physical page corresponding to the corresponding critical area.

12. The apparatus according to claim 9, wherein the programming instructions, when executed by the at least one processor, cause the apparatus to:
set a status identifier corresponding to the target mapping entry to a first identifier, wherein the first identifier indicates to forbid remapping of a physical page in a corresponding mapping entry.

13. The apparatus according to claim 10, wherein the programming instructions, when executed by the at least one processor, cause the apparatus to:
obtain the area information of the first virtual memory area from the first mapping relationship based on the application identifier of the application;
when performing data access based on the area information of the first virtual memory area to trigger a page fault processing procedure, obtain a stored physical page of the first physical memory area based on the area information of the first virtual memory area; and
remap the physical page of the first physical memory area to the first virtual memory area, to restore the running status of the application based on the critical data stored in the first physical memory area.

14. The apparatus according to claim 13, wherein the first mapping relationship further comprises a process identifier of an application corresponding to each piece of area information, the second mapping relationship further comprises a process identifier corresponding to each critical area, and the programming instructions, when executed by the at least one processor, cause the apparatus to:
determine, from the second mapping relationship based on a process identifier comprised in a first mapping entry in which the application identifier of the application is located, a second mapping entry that comprises a same process identifier as the process identifier comprised in the first mapping entry;
update both of the process identifier comprised in the first mapping entry and the process identifier comprised in the second mapping entry to a target process identifier, wherein the target process identifier includes a process identifier obtained after an application is restored and started; and
obtain the physical page of the first physical memory area from the second mapping relationship based on the area information of the first virtual memory area and the target process identifier.

15. The apparatus according to claim 14, wherein the programming instructions, when executed by the at least one processor, cause the apparatus to:
modify a status identifier of the second mapping entry into a second identifier, wherein the second identifier indicates that remapping is allowed for a physical page in a corresponding mapping entry.

16. The apparatus according to claim 13, wherein the programming instructions, when executed by the at least one processor, cause the apparatus to:
correct the reference count, reverse mapping information, status information, global statistics information, and a control structure association relationship that are of the physical page of the first physical memory area; and
add the physical page of the first physical memory area to a target process page table, wherein the target process page table includes a process page table corresponding to a process of the application.

17. A non-transitory computer-readable storage medium stores instructions that, when the instructions are executed by at least one processor, causes the at least one processor to:
storing management information of a first virtual memory area corresponding to a first physical memory area in a proper running process of an application, wherein the first physical memory area stores critical data in a running process of the application;
maintaining a physical page of the first physical memory area when it is detected that the application exits abnormally, including:
obtaining area information of a second virtual memory area, wherein the second virtual memory area includes a virtual memory area that is currently being demapped and that corresponds to the application;
searching stored second mapping relationship for a target mapping entry that matches the area information of the second virtual memory area, wherein the second mapping relationship comprises a plurality of mapping entries, and each target mapping entry stores area information of one critical area and a physical page corresponding to the corresponding critical area;
if the target mapping entry that matches the area information of the second virtual memory area exists in the second mapping relationship, obtaining a physical page corresponding to the second virtual memory area, and using the physical page corresponding to the second virtual memory area as the physical page of the first physical memory area;
adding a reference count of the physical page of the first physical memory area; and
adding the physical page of the first physical memory area to the target mapping entry; and
remapping the physical page of the first physical memory area to the first virtual memory area based on the management information of the first virtual memory area when it is detected that the application is started, to restore a running status of the application.

18. The non-transitory computer-readable storage medium of claim 17, wherein the storing management information of a first virtual memory area corresponding to a first physical memory area comprises:
correspondingly storing area information of the first virtual memory area and an application identifier of the application in a first mapping relationship, wherein the first mapping relationship comprises a plurality of pieces of area information and an application identifier of an application corresponding to each piece of area information, wherein the management information of the first virtual memory area comprises the area information of the first virtual memory area and the application identifier of the application.

* * * * *